United States Patent Office 3,478,639
Patented Nov. 18, 1969

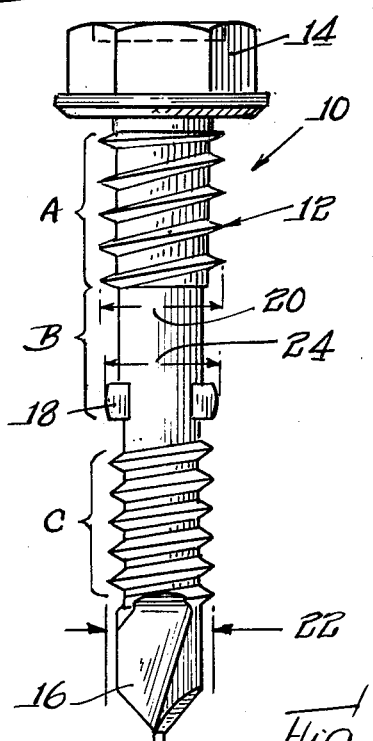
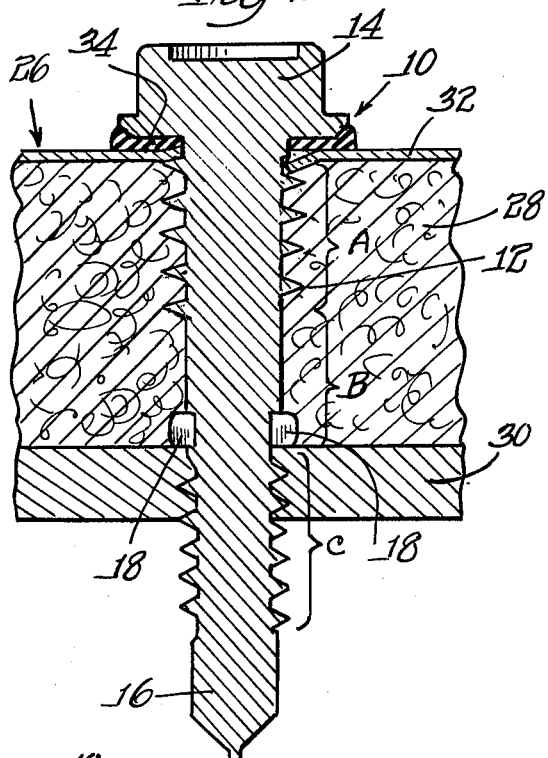
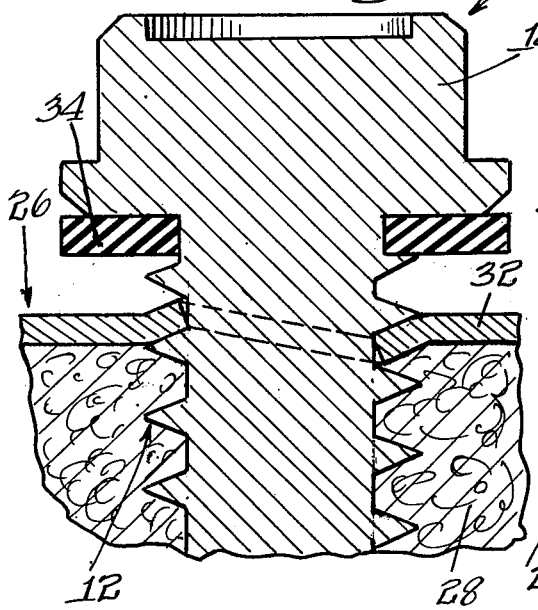
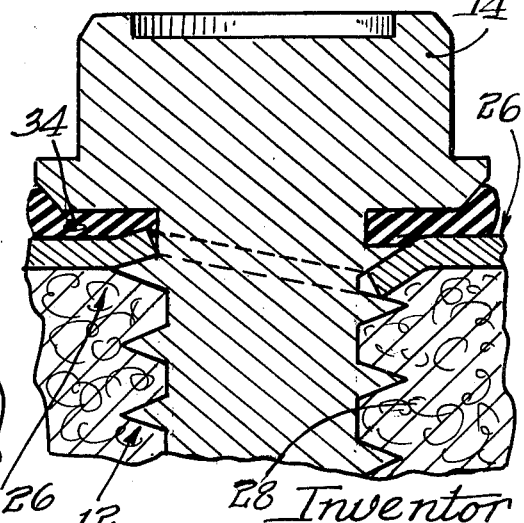

1

3,478,639
SCREW TYPE FASTENER
Ned Joseph Gruca, Elgin, Ill., assignor to Illinois Tool
Works Inc., Chicago, Ill., a corporation of Delaware
Filed Sept. 9, 1968, Ser. No. 758,503
Int. Cl. F16b 35/00, 33/02
U.S. Cl. 85—41                                        9 Claims

ABSTRACT OF THE DISCLOSURE

This invention relates generally to screw type fasteners, and more particularly to fasteners of the type adapted for use with structures such as panels comprising insulation material such as foam insulation bounded by sheet material. One embodiment of the invention disclosed herein consists of a screw member which includes a shank with a clamping head at one extremity, said shank having a work entering or drilling extremity oppositely disposed from the head, and a first section of thread convolutions of relatively high pitch extending from the vicinity of the clamping side of the head and terminating intermediate said head and the entering extremity of the shank. A second section of thread convolutions is provided on the shank and is axially separated from the first section of thread convolutions by an unthreaded shank section. The second section of thread convolutions has a pitch and outer diameter less than the pitch and outer diameter of the first section of thread convolutions. Abutment means in the form of wing or lug members of limited axial extent radiate from the unthreaded shank section in the vicinity of the trailing convolutions of said second threaded section, the diameter determined by said wings or lugs being greater than the outer diameter of the convolutions of the second threaded section and less than the outer diameter of the convolutions of the first threaded section. The fastener as disclosed herein includes a drilling portion at the entering end of the shank immediately beyond the second section of threaded convolutions.

Description

One of the problems incident to the use of rotary threaded fasteners with relatively soft panels such as foam insulation material is that of avoiding compression or distortion of the insulation material. Such deformation of the insulation material tends to reduce its effectiveness as an insulator. Frequently, the insulation material is bounded on one side by a relatively thin top sheet of metallic stock, and on the other side by a purlin of considerably greater thickness than the aforesaid thin sheet stock.

It is an object of the present invention to provide a threaded fastener which may be forced transversely through a panel of the type referred to above without subjecting the insulation or foam material to any appreciable amount of compression.

To tighten a screw member within a panel of the type referred to above without subjecting the insulation material thereof to deleterious distortion, it is proposed to provide a screw with a novel arrangement of thread sections of varying pitch and diameters, so that, as the fastener is finally tightened within the panel, a tendency for the clamping head of the screw to exert compressive forces against the insulation material is reduced to a minimum.

More specifically the invention contemplates a novel and practical screw fastener which when applied to the panel will cause the top thin sheet material to flex away from the insulation material and thus preclude undesirable compressive forces against the insulation material.

It is a further object of the present invention to provide a new and efficiently operable screw fastener of the type referred to above which may also be employed to initially drill an aperture in the panel.

A further object of the present invention is to provide a screw fastener for use with panels of the type referred to above which is so designed as to limit the extent to which the fastener may penetrate the panel. The foregoing and other objects and advantages will be more apparent from the following detailed description, when considered in connection with the accompanying drawing wherein:

FIG. 1 is a side elevational view of a screw fastener which is representative of one embodiment of the present invention;

FIG. 2 is a central sectional view of the fastener shown in FIG. 1 in operative association with an insulated panel structure;

FIG. 3 is an enlarged central longitudinal sectional view as shown at the upper portion of FIG. 2, prior to the final tightening of the fastener within the panel; and FIG. 4 is a central longitudinal sectional view similar to FIG. 3 disclosing the fastener as finally tightened within the panel.

Referring now to the drawing more in detail, wherein like numerals have been employed to designate similar parts throughout the various views, it will be noted that a screw type fastener of the type contemplated by the present invention is designated generally by the numeral 10. The fastener 10 includes a shank 12 having a work clamping head 14 at one extremity thereof and an entering end 16 which in the present embodiment is in the nature of a drill point. The shank 12 includes a threaded section A extending axially from the vicinity of the clamping side of the head 14, an unthreaded section B extending axially beyond the threaded section A, and a second threaded section C extending axially beyond the unthreaded section B. It is important to note that the thread convolutions of the section A are of relatively high pitch, whereas the thread convolutions of the section C are of lower pitch and also less in outer diameter than the pitch and outer diameter of the thread convolutions of the section A radiating outwardly. From the unthreaded shank section B in the vicinity of the threaded section C are oppositely disposed lug means or wings 18 of limited axial extent. The outer diameter of the threaded section A is designated by the numeral 20, and the maximum or outer diameter of the thread convolutions of the section C is designated by the numeral 22, whereas the diameter defined by the outer limits of the lug or wing means 18 is designated by the numeral 24.

As previously indicated, the present invention contemplates a screw type fastener which has a very practical application for use with insulating panels. In FIGS. 2 to 4, inclusive, the screw fastener 10 is disclosed in association with an insulating panel structure designated generally by the numeral 26. This panel structure includes a central or intermediate section 28 of insulating material, as for example foam material. One side of the section 28 is bounded by a purlin or wall member 30, and the other side is covered by a relatively thin sheet 32 which in the present disclosure comprises a relatively thin metallic sheet.

The fastener 10 is employed to secure the insulating section 28 between the purlin 30 on one side and the relatively thin sheet metal stock 32 on the opposite side. The initial application of the fastener 10 is accomplished by engaging the drill point 16 with the thin sheet stock 32. The entering end of the screw causes an aperture to be drilled through the sheet 32 and also through the insulating foam material 28, and ultimately through the purlin. In many instances an annular sealing washer 34 of suitable relatively soft rubberlike material is applied to the underside of the screw head 14 prior to the application of the screw fastener to the panel. As the fastener is rotated, it penetrates the panel 26 and the relatively high pitch of the convolutions of the shank section A cause outward deflection of the sheet 32 in the vicinity of the previously drilled aperture in the sheet to be flexed outwardly into firm clamping engagement with the sealing washer 34. The limit to which the screw fastener 30 may be inserted within the panel is determined by the engagement of the wing means 18 with the adjacent surface of the purlin or wall 30, as clearly shown in FIGS. 2 and 4. As the coarse pitch thread convolutions of the section A are embedded within the relatively soft insulating foam section 28, before the lug or wing means 18 move into engagement with the purlin 30, the aforesaid outward flexing of the stock of the relatively thin sheet 32 is deflected outwardly. Thus, as the screw fastener reaches the limit of its penetration within the panel 26, the clamping side of the screw head 14 has exerted little or no clamping force against the insulating foam section 28. This is extremely important, because any tendency to compress the foam material 28 reduces the desired cellular content of the insulating material, thereby materially impairing its insulating efficiency.

It has been found practical to so form the coarse pitch thread convolutions of the section A that a runout convolution is formed at the point of the section A closest to the clamping side of the screw head 14. This is shown clearly in FIGS. 2 and 4. While this structural configuration is not an absolute necessity, it has been found to be desirable in certain types of applications. In instances where screw fasteners of the type described herein are not equipped with a drill point, it may be necessary to preform an aperture in the panel before applying the fastener.

From the foregoing, it will be apparent that the present invention contemplates a very simple yet practical screw type fastener which may be used effectively in instances where the elements of an insulating panel are to be secured together as described above. Also, the screw fastener described herein may be produced by practicing conventional screw manufacturing processes, as for example thread rolling, and the like. The wings or ears 18 may be formed by pinching oppositely disposed circumferential peripheral portions of the unthreaded shank portion, and this may be accomplished by conventional methods of metal working.

What is claimed is:

1. A screw type fastener adapted to fasten a thin sheet of material to a thicker sheet spaced from it by a predetermined thickness of insulating material, said fastener including a shank having a drilling tip integrally formed on an entering extremity, a work clamping head at the opposite extremity of the shank, a first section of thread convolutions of relatively high pitch extending axially along the periphery of said shank a distance less than the thickness of said insulating material from the vicinity of the clamping side of the head to a point intermediate said head and entering end, a second section of thread convolutions axially separated from said first threaded section by an unthreaded shank section, said second section of thread convolutions being adapted to form and engage threads in said thicker sheet and having a pitch and outer diameter less than the pitch and outer diameter of said first section of thread convolutions, and rigid abutment means of limited axial extent radiating outwardly from said unthreaded shank section and located adjacent the trailing convolutions of said second threaded section so as to control the penetration of said second threaded section in said thicker sheet, the diameter determined by said abutment means being greater than the outer diameter of the convolutions of said second threaded section and less than the outer diameter of the convolutions of said first threaded section, said abutment means being further adapted to enlarge the hole drilled in said thin sheet of material by said drilling tip to a size less than the outer diameter of said first section of thread convolutions.

2. A screw type fastener as set forth in claim 1 wherein the pitch and outer diameter of the thread convolutions of the first threaded section are such as to effect helical distortion of the relatively thin sheet material when the fastener is rotatably applied, and the pitch of the thread convolutions of the second section are such as to enable the formation of complementary thread convolutions in the sheet material of greater thickness, the differences in pitch between the two threaded sections causing the thin sheet to be moved away from the thicker sheet as the screw is rotating in each whereby to prevent the insulation from being crushed.

3. A screw type fastener as set forth in claim 1 wherein the convolutions of the first threaded section terminate short of the clamping side of the screw head.

4. A screw type fastener as set forth in claim 1 wherein the first threaded section and the unthreaded shank section extending beyond said first threaded section are of sufficient combined axial dimension to permit penetration of panel insulating material of substantial thickness.

5. A screw type fastener as set forth in claim 1 wherein a sealing washer member is provided adjacent the clamping side of the screw head.

6. A screw type fastener as set forth in claim 5 wherein the convolutions of the first threaded section terminate short of the clamping side of the screw head by a distance less than the combined thickness of the thin sheet of material and the sealing washer whereby said sealing washer will be compressed and said thin sheet will be firmly clamped between said sealing washer and the convolution on said first threaded section closest to said screw head when said fastener is rotated sufficiently far to cause disengagement of said thread convolutions and said thin sheet of material.

7. In combination with a panel structure consisting of an inner section of insulating material of substantial thickness such as foam insulation bounded on one side by a first relatively thin sheet of material and on the opposite side by a second sheet of material, a screw type fastener having a shank completely traversing said panel structure, a head at one extremity of the shank clampingly urged against the relatively thin first sheet material of the panel, a first section of thread convolutions of relatively high pitch extending along the periphery of said shank from the vicinity of the clamping side of the head to a point terminating within said insulating section of the panel, a second section of thread convolutions axially separated from the first threaded section by an unthreaded shank section located within said insulating panel section, said second section of thread convolutions having a pitch and outer diameter less than the pitch and outer diameter of said first section of thread convolutions and traversing said second sheet material of said panel, and transversely extending abutment means radiating from said unthreaded shank section for engaging the inner surface of said second sheet material, the diameter determined by said abutment means being greater than the outer diameter of the convolutions of said second threaded section and less than the outer diameter of said first threaded section.

8. The combination as set forth in claim 7 wherein a sealing washer is clamped between the clamping side of the screw head and the outer surface of said first sheet material of the panel structure.

9. The combination as set forth in claim 7 wherein the entering extremity of the screw shank projects beyond the outer surface of said second sheet material of the panel structure and is provided with a drill section.

References Cited

UNITED STATES PATENTS

| | | | |
|---|---|---|---|
| 1,939,737 | 12/1933 | Thomson | 85—1 |
| 827,230 | 7/1906 | Goeppinger | 85—1 |
| 1,028,795 | 6/1912 | Steinhouse | 85—1 |
| 2,761,347 | 9/1956 | McKee. | |
| 3,056,234 | 10/1962 | Nelsson et al. | 85—47 |
| 3,124,031 | 3/1964 | Knohl | 85—47 |
| 3,358,548 | 12/1967 | Dylslin | 85—47 |

FOREIGN PATENTS 110,083  3/1940  Australia.

EDWARD C. ALLEN, Primary Examiner

U.S. Cl. X.R.

85—46